E. C. CRITCHLOW.
FLY WHEEL.
APPLICATION FILED DEC. 7, 1908.
960,277.
Patented June 7, 1910.
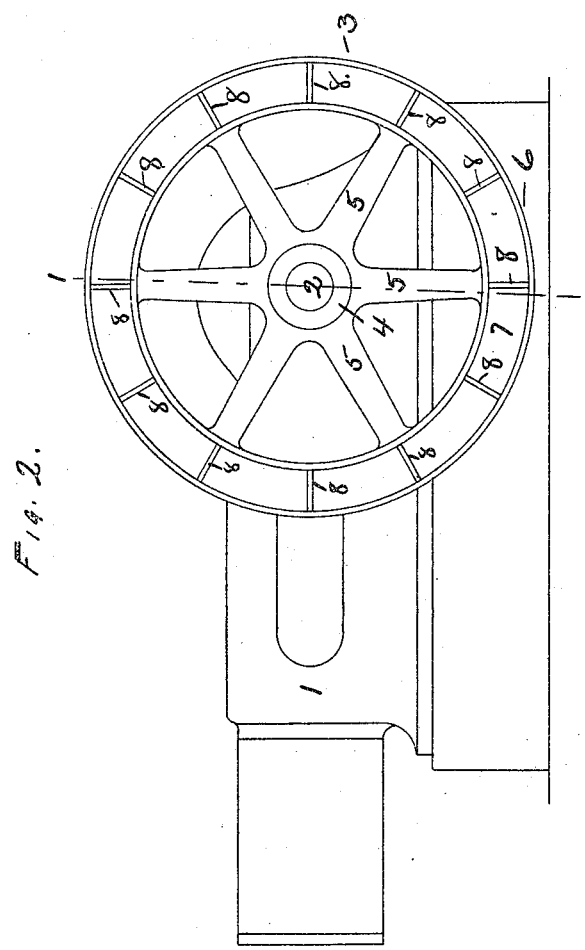
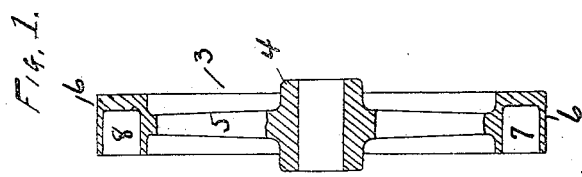
Witnesses
Inventor
Edward C. Critchlow
Attorney

UNITED STATES PATENT OFFICE.

EDWARD C. CRITCHLOW, OF GROVE CITY, PENNSYLVANIA.

FLY-WHEEL.

960,277. Specification of Letters Patent. Patented June 7, 1910.

Application filed December 7, 1908. Serial No. 466,234.

*To all whom it may concern:*

Be it known that I, EDWARD C. CRITCHLOW, a citizen of the United States, residing at Grove City, in the county of Mercer and State of Pennsylvania, have invented new and useful Improvements in Fly-Wheels, of which the following is a specification.

This invention relates to engine fly wheels, and consists in certain improvements in the construction thereof as will be hereinafter fully described and pointed out in the claims.

The invention is particularly adapted for use on explosive engines where it is common to use the fly wheel as a lever for actuating the engine initially to start it. These wheels have ordinarily been formed with spokes, and the operator has thrown his weight on the wheel by standing on the spokes. This has been a dangerous operation in that, if by any accident the foot slipped through the wheel, it has resulted in injury, and sometimes in the death of the operator.

The object of this invention is to increase the safety with which the device may be operated, and also to increase the leverage over what has been effective in the constructions heretofore made.

The invention is illustrated in the accompanying drawings as follows:

Figure 1 is a section on the line 1—1 in Fig. 2. Fig. 2 is a side elevation of an engine and fly wheel.

1 marks the engine; 2 the engine shaft; 3 the fly wheel.

The fly wheel is provided with the hub 4, spokes 5 and rim 6. The rim has the annular groove 7 in its side in which is arranged a series of steps 8. In operating the device, the operator uses the steps 8 instead of the spokes. In this the bottom of the groove prevents the slipping through of the feet, so that the device has greater safety than where the spokes are used, and inasmuch as the steps are near the periphery of the wheel they give the greatest possible leverage. It is also possible to put in a greater number of steps than the number of spokes. This can be done where the steps are used without materially adding to the expense, whereas, if the spokes were increased to give an additional number of steps, the expense would be increased without increasing the efficiency otherwise. By making the groove 7 extend past the center of the wheel in an axial direction, the steps are given a sufficient surface to afford a ready footing.

What I claim as new is:

1. A fly wheel having an annular groove in one side of the rim extending beyond the center of the rim in an axial direction; and steps arranged in the groove forming a foothold on which an operator may place his foot to swing on the wheel to turn the same.

2. A fly wheel having an annular groove in one side of the rim extending beyond the center of the rim in an axial direction; and steps arranged in the groove forming a foothold on which the operator may place his foot to swing on the wheel to turn the same, in combination with a reciprocating engine, having a crank shaft on which the fly wheel is mounted.

In testimony whereof, I have hereunto set my hand in the presence of two subscribing witnesses.

EDWARD C. CRITCHLOW.

Witnesses:
C. F. LAWRENCE,
CASSIUS BARBER.